United States Patent [19]
Fischer et al.

[11] Patent Number: 5,292,480
[45] Date of Patent: Mar. 8, 1994

[54] ACID-ANHYDRIDE ESTERS AS OIL FIELD CORROSION INHIBITORS

[75] Inventors: Eugene R. Fischer, James Island; John A. Alford, Goose Creek; Paul G. Boyd, Moncks Corner, all of S.C.

[73] Assignee: Westvaco Corporation, New York, N.Y.

[21] Appl. No.: 46,077

[22] Filed: Apr. 12, 1993

Related U.S. Application Data

[63] Continuation-in-part of Ser. No. 897,007, Jun. 11, 1992, abandoned.

[51] Int. Cl.$^5$ .............................................. C23F 11/04
[52] U.S. Cl. ................................... 422/12; 252/8.555; 427/239; 549/240; 549/253
[58] Field of Search ........................ 422/12; 427/239; 252/8.555

[56] References Cited

U.S. PATENT DOCUMENTS

| | | | |
|---|---|---|---|
| 2,188,882 | 1/1940 | Clocker | 549/240 |
| 2,275,843 | 3/1942 | Clocker | 549/253 |
| 2,756,210 | 7/1956 | Raifsnider | 252/8.555 |
| 2,948,598 | 8/1960 | Brehm | 44/404 |
| 4,517,110 | 5/1985 | Suzuki et al. | 252/180 |
| 4,927,669 | 5/1990 | Knox et al. | 427/239 |
| 5,174,913 | 12/1992 | Alford et al. | 252/8.555 |

FOREIGN PATENT DOCUMENTS 785474 10/1957 United Kingdom .

OTHER PUBLICATIONS

*Advanced Organic Chemistry, Reactions, Mechanism and Structure*, Mar., (2nd ed. 1977), pp. 726 and 761-766.

*Primary Examiner*—Bernard Dentz
*Attorney, Agent, or Firm*—Daniel B. Reece, IV; Terry B. McDaniel; Richard L. Schmalz

[57] ABSTRACT

A corrosion inhibitor with excellent film forming and film persistency characteristics may be produced by first reacting $C_{18}$ unsaturated fatty acids with maleic anhydride or fumaric acid to produce the fatty acid Diels-Alder adduct or the fatty acid-ene reaction product. This adduct or reaction product is further reacted in a condensation or hydrolysation reaction with a polyalcohol to form an acid-anhydride ester corrosion inhibitor. The ester may be reacted with amines, metal hydroxides, metal oxides, ammonia, and combinations thereof to neutralize the ester. Surfactants may be added to tailor the inhibitor formulation to meet the specific needs of the user (i.e., the corrosion inhibitor may be formulated to produce an oil-soluble, highly water-dispersible corrosion inhibitor or an oil-dispersible, water-soluble corrosion inhibitor). Suitable carrier solvents may be employed where needed to effectively disperse the corrosion inhibitor formulation.

19 Claims, No Drawings

ACID-ANHYDRIDE ESTERS AS OIL FIELD CORROSION INHIBITORS

This application is a continuation-in-part of our commonly assigned, co-pending U.S. patent application Ser. No. 7/897,007 filed Jun. 11, 1992, entitled "Acid-Anhydride Esters As Oil Field Corrosion Inhibitors, now abandoned."

FIELD OF INVENTION

This invention relates to inhibiting corrosion of metals in oil field applications where hydrocarbons and water are being taken from producing wells. Water can lead to corrosion of metal piping, etc., which is used in downhole applications. It is, therefore, necessary to add a suitable agent to the oil/water medium to effectively reduce or eliminate problems which are associated with corrosion of metallic parts. Failure to do so can result in extensive corrosion of metal in the field leading to expensive repair and lost productivity.

BACKGROUND OF THE INVENTION

The oil industry has traditionally employed oil-soluble dimer acid based corrosion inhibitors to reduce corrosion in oil well piping. These inhibiting formulations commonly consist of materials which are produced by the thermal condensation of functionalized $C_{18}$ fatty acids (containing one or two double bonds, e.g., oleic and linoleic, respectively). Examples of well known methods by which the thermal polymerization of fatty acids occur include heating an appropriate fatty acid mixture (e.g., tall oil fatty acid or soya fatty acid) in the presence of a clay or other suitable catalyst to give varying amounts of $C_{36}$ (dimerized) and $C_{54}$ (trimerized) fatty acids. These dimer and/or trimer fatty acids are neutralized with an appropriate amine (generally a diethylenetriamine, or DETA) derived fatty acid imidazoline to produce a corrosion inhibitor. These inhibitors are oil-soluble with minimum water dispersibility and act by coating metal surfaces (via adsorption by polar groups), thereby excluding the water which is necessary for the corrosion process to occur.

However, over the past few years several factors have caused the oil industry to re-evaluate its traditional preference for oil-soluble water-dispersible corrosion inhibitors. Currently, many oil wells are producing mixtures higher in water content than in oil. Efficiency could be improved by utilizing the majority fluid in these wells as the carrier for the inhibitor. Also, water (containing dissolved earth minerals) is the medium which causes electrochemical corrosion in oil and gas pipelines. If one could effectively disrupt the corrosion cycle at its source, one would have a more effective inhibitor. Finally, the carrier solvent constitutes about 70% of a standard corrosion inhibitor package. Replacing the traditional heavy aromatic napthas and other hydrocarbon solvents with water would eliminate the environmental damage caused by using hydrocarbon solvents—while also reducing costs.

Thus, the developing trend in the oil industry is to switch from oil-soluble delivery systems for corrosion inhibitors to water-soluble delivery systems. This is evidenced by the increasing number of companies which require corrosion inhibitors to be evaluated via linear polarization resistance meters (which test for inhibition in pure aqueous systems rather than the traditional hydrocarbon/aqueous systems).

In order to increase their water-dispersibility, conventional oil-soluble dimer/trimer mixtures have been coformulated with both fatty acid imidazolines and a variety of surfactants. However, this approach has proven limited in its scope. The use of enough surfactant to render the dimer/trimer molecule water-soluble results in drastically reduced film formation and film persistency. That is, the corrosion inhibitor simply washes-off the metal, leaving it unprotected. Also, these highly surfacted packages have a tendency to emulsify under downhole conditions, resulting in major problems for the user.

Water-soluble corrosion inhibitors which are currently available include alkyl pyridine quaternary compounds (generally benzyl quats), imidazoline salts (with acetic acid), and imidazoline ethoxylates. Although these inhibitors have found limited use in oil and gas pipelines, they have not yet proven tenacious enough to successfully inhibit corrosion when utilized under the dynamic downhole conditions prevalent in producing oil wells.

A method for inhibiting corrosion in downwell oil field equipment is taught in commonly assigned U.S. Pat. No. 4,927,669 to Knox and Fischer (which is hereby incorporated by reference). There, $C_{18}$ unsaturated fatty acids and maleic anhydride (or fumaric acid) are reacted to produce the fatty acid Diels-Alder adduct (or fatty acid-ene reaction product). An Inhibitor package containing this adduct or reaction product is added to the oil/water medium in order to coat and protect the metal equipment from corrosion. However, this corrosion inhibitor (and its corresponding inhibitor packages) is oil soluble, not water soluble. Thus, it is subject to the limitations inherent with oil soluble inhibitors.

Therefore, it is the object of this invention to provide an effective and economical oil field corrosion inhibitor capable of being manufactured as either a highly water-dispersible molecule or as a water-soluble molecule. These molecules can be formulated to yield oil-soluble, highly water-dispersible corrosion inhibitor packages or oil-dispersible, water-soluble corrosion inhibitor packages, based upon the specific individual needs of the user. Other objects, features, and advantages will be evident from the following disclosures.

SUMMARY OF THE INVENTION

The object of this invention is met by first reacting $C_{18}$ unsaturated fatty acids with maleic anhydride (or fumaric acid) to produce the fatty acid Diels-Alder adduct (or the fatty acid-ene reaction product). This adduct and/or reaction product is reacted in a condensation reaction with a polyalcohol to form an acid-anhydride ester corrosion inhibitor.

This acid-anhydride ester can be further reacted to form other corrosion inhibitors. For example, the ester can be reacted with either an amine or a metal to form corrosion inhibitors. Alternatively, the ester can be first reacted with an amine and subsequently with a metal to form a corrosion inhibitor. Moreover, the ester can be reacted with a metal and, Subsequently, with an amine to form a corrosion inhibitor. Each of these acid-anhydride ester-based variations exhibit superior corrosion inhibiting characteristics. Surfactants and/or a suitable carrier solvent may be added to each inhibitor produce a corrosion inhibitor package formulation that is either oil-soluble, highly water-dispersible or oil-dispersible, water-soluble . . . depending upon the requirements of the user.

The downhole conditions in an oil or gas well can vary greatly from one well to the next. That is, the environment may be "sweet" ($CO_2$) or "sour" ($H_2S$) I the water to oil ratios may change, and the mineral content of the water may vary. However, the above corrosion inhibitor packages can be formulated to meet the specific requirements of these varied environments.

It should be noted that these corrosion inhibitors do not have to dry to be effective. Indeed, these corrosion inhibitors are always in the presence of a solvent or solvents (i.e., water, produced fluid from the well, formulated carrier solvents, etc.). Yet these corrosion inhibitors maintain the ability to form protective films with excellent persistencies on metal surfaces under a wide spectrum of conditions.

Traditionally, it has been generally accepted by those skilled in the art that the imparted corrosion protection is proportional to the concentration of imidazoline carboxylate salt in the inhibitor. In the case of the acid-anhydride esters described herein, at equivalent concentrations the imidazoline carboxylate salt dosage is reduced by as much as 80% yet corrosion protection is equal to or better than analogous polybasic acid-imidazoline formulations of equal total component concentrations.

Indeed, the formulated esters exhibited both greatly improved water dispersibility or solubility and improved corrosion inhibition (i.e., film persistency) over the current standard industry corrosion inhibiting formulations (both oil-soluble and water-soluble). Also, the dosage required to provide the downhole industry standard of 90% corrosion protection or greater is significantly reduced. Inhibitors showing less than this value are not considered effective in downhole applications.

DESCRIPTION OF THE PREFERRED EMBODIMENT

The versatile corrosion inhibiting acid-anhydride ester molecule may be represented by the following chemical structures:

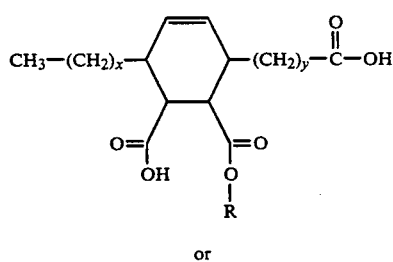

where R is a polyalcohol (or combination of polyalcohols) and $x + y = 12$.

The acid-anhydride ester may be further reacted with an amine and/or a metal to form a corrosion inhibiting molecule represented by the following chemical structures:

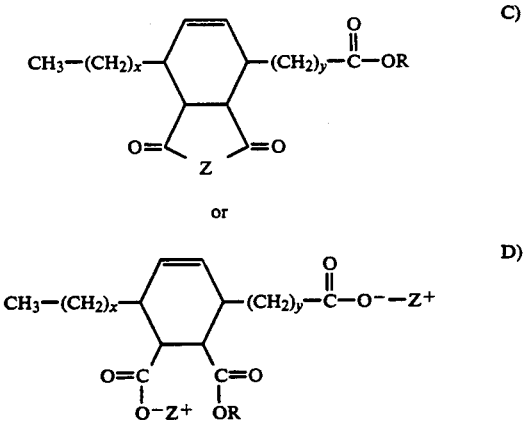

where R is a polyalcohol, $x + y$ 12, and Z and $Z^+$ are members selected from the group consisting of: imidazoline, fatty diamines, metal hydroxides, metal oxides, ammonia, and combinations thereof.

The process which produces the corrosion inhibitors first follows the teaching of U.S. Pat. No. 4,927,669 by reacting (in a Diels-Alder reaction) one or more $C_{18}$ unsaturated fatty acids with a member selected from the group consisting of maleic anhydride, fumaric acid, and combinations thereof, to produce the known fatty acid Diels-Alder adduct or fatty acid-ene reaction product. However, this adduct or reaction product is further reacted (in a condensation or hydrolyzation reaction) with one or more polyalcohols to form an acid-anhydride partial ester with a low acid number (i.e., from 80 to 265).

This acid-anhydride ester may be reacted (i.e., neutralized) with an amine or amines to form a salt or soap. The resulting salted (or neutralized) ester may be further reacted with a metal hydroxide, a metal oxide, and/or ammonia to additionally salt (or neutralize) the ester. Conversely, the acid-anhydride ester may be reacted with a metal hydroxide, a metal oxide, and/or ammonia to form a salt. The resulting salted ester may be further salted (or neutralized) with an amine (or amines) to additionally salt the ester. Each of these embodiments is an excellent corrosion inhibitor. Various surfactants may be added to produce an inhibitor formulation tailored to meet the needs of the user. Where necessary, a suitable carrier solvent may be employed to disperse the corrosion inhibitor.

The final water-solubility of the corrosion inhibiting ester (e.g., whether it is water-dispersible or water-soluble) will depend upon the degree of both the esterification and neutralization (i.e., salting) of the molecule, the amount and character of surfactants added to the formulation, and the amount and character of the carrier solvent utilized. The molecular weight and hydrophilic character of the reacting polyalcohol largely determines the resulting degree of esterification. The corrosion inhibiting ester in the present invention has a range of esterification from 25–75%, with the preferred range being 40–60%.

Although the acid-anhydride ester is an excellent corrosion inhibitor, it is preferred to enhance the degree of corrosion inhibition by neutralizing (i.e., salting) the ester. The degree of neutralization of the ester molecule is determined by the choice of amine (i.e., its hydrophilic/hydrophobic nature), metal, or ammonia derivative used. A preferred corrosion inhibitor is produced by neutralizing from of 50 to 77% by weight of the ester with imidazoline, fatty diamines, or Combinations thereof. Additionally, from 1 to 14% by weight of the ester may be reacted with a metal hydroxide, a metal oxide, ammonia, or combination thereof either alone or in conjunction with the amine neutralization.

Any of the basic oils containing a significant amount of unsaturated $C_{18}$ is a suitable starting material for preparing the acid anhydride used in producing the corrosion inhibitor. These oils include corn oil, cottonseed oil, lard, linseed oil, mustard seed oil, olive oil, palm oil, peanut oil, rapeseed oil, rice bran oil, safflower oil, sesame oil, sunflower oil, tallow, whale oil, and the like. A preferred starting material is a mixture of tall oil fatty acids containing about 40-50% linoleic acid and 40-50% oleic/elaidic acid. Oleic and elaidic acids are the cis and trans forms, respectively, of the unsaturated $C_{18}$ fatty acid in tall oil. Typically, the amount of functionalized fatty acids is about 85-95% in such mixtures.

To prepare the acid anhydride, suitable amounts of maleic anhydride and unsaturated $C_{18}$ fatty acid are charged in a reaction apparatus (pressure reactor), and the mixture is heated to 240° C. and held for approximately two hours in the presence of an iodine catalyst. This crude material, composed primarily of the Diels-Alder adduct of linoleic acid, is then distilled under suitable conditions to remove any unreacted fatty acid which is still present. The Diels-Alder adducts formation is taught in March, *Advanced Organic Chemistry, Reactions, Mechanism and Structures* (2nd ed. 1977), pp. 761-766 (which is hereby incorporated by reference). It is preferred to treat, in a subsequent step, the residual unreacted oleic/elaidic acid with additional maleic anhydride under more vigorous conditions to form an ene adduct (thereby increasing the yield of acid anhydride). The ene reaction and its product are also taught in March, *Advanced Organic Chemistry, Reactions, Mechanism and Structure* (2nd ed. 1977), p. 726 (which is hereby incorporated by reference). After both syntheses, removal of fatty acid is referred. Material obtained from the overheads of said removal steps (oleic/elaidic acids) can be maleinized in a subsequent step to produce product which is largely an ene adduct. This material may be back-blended with the initial Diels-Alder adduct, or used as is, to give a similar acid anhydride which has virtually equivalent performance characteristics. The reactions are performed sequentially to aid in processing and prevent thermal degradation of the Diels-Alder adduct. This material so obtained has a composition consisting of approximately 75 to 95% maleinized fatty acids, 5 to 20% thermal dimer ($C_{36}$) and trimer ($C_{54}$), and remaining unreacted fatty acid depending upon the relative proportions of the other constituents. Other constituents may be present in trace amounts in the purified material as well, such as esters, bis maleic anhydride adducts, and other types of species. These materials do not appear to qualitatively affect performance results and, therefore, are not routinely considered.

Polyalcohols which are suitable for use in the condensation or hydrolyzation reaction to form the ester include, but are not limited to, the following:
ethylene glycol
diethylene glycol
triethylene glycol
polyethylene glycol
glycerin,
pentaerythritol,
trimethylolpentane, and
sorbitol.
Combinations of these polyalcohols may also be suitable for use.

Proper metal hydroxides and metal oxides for use in producing the inhibitor include derivatives of lithium, potassium, and sodium.

Surfactants which are suitable for use with the inhibitor include, but are not limited to, the following:

(a) fatty acid ethoxylates having a chemical structure of

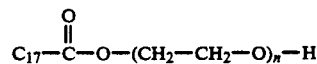

where n is an integer between 4 and 20, (b) nonylphenol ethoxylates having a chemical structure of

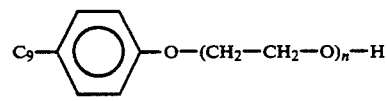

where n is an integer between 4 and 20, (c) alcohol ethoxylates having a chemical structure of

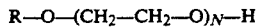

where R is $C_{12}$-$C_{18}$ and n is an integer between 4 and 20, and (d) dodecylbenzenesulfonates having a chemical structure of

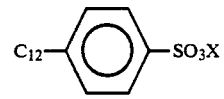

where X is a metal, amine or ammonia.

Depending upon the water-dispersibility or solubility of the corrosion inhibitor and the environment in which the inhibitor is to be used, suitable carrier solvent formulations may include hydrocarbons, water, and/or alcohols.

It is within the ability of a skilled artisan to utilize a condensation reaction to produce an ester with a desired degree of esterification. The condensation reaction to produce an ester may be conducted at a temperature range of 80°-240° C. until the water of reaction is removed. The ionic reaction with imidazoline (or the like) to produce the neutralized ester may be conducted at a temperature range of 38°-94° C. for a period of between 0.5 and 2.0 hours. The ionic reaction with the metal hydroxide (or the like) to further neutralize the ester may be conducted at a temperature range of 38°-94° C. for a period of between 0.5 and 2.0 hours.

The following examples are provided to further illustrate the present invention and are not to be construed as limiting the invention in any manner.

EXAMPLE 1

A water-soluble corrosion inhibitor was produced via the following method. To a clean reaction apparatus (pressure reactor) was added 85.7% by weight of L-5, 14.2% by weight of maleic anhydride, and 0.1% of an iodine catalyst. (L-5 is a mixture of tall oil fatty acids containing about 40–50% linoleic acid and 40–50% oleic/elaidic acid, manufactured by Westvaco, Inc.) The mixture was heated and held for approximately two hours at 240° C. The resulting material was I distilled under suitable conditions to remove any unreacted fatty acid which was still present.

In a second step, the residual unreacted oleic/elaidic acid is treated, under more vigorous conditions, with additional maleic anhydride to form the ene adduct. To a clean reaction apparatus (pressure reactor) was added 70.7% by weight of the residual unreacted oleic/eladic acid and 29.3% by weight of maleic anhydride. The mixture was heated and held for approximately four hours at 221° C. The resulting acid-anhydride material was distilled under suitable conditions to remove any unreacted fatty acid which was still present. This acid-anhydride material was back-blended in a 1:1 ratio by weight with the distilled acid-anhydride material from the first step to produce the acid-anhydride material subsequently used in each of the following examples.

To a clean reactor was charged 88.6% by weight of the above produced acid-anhydride material. To the material was added (with agitation) 10.9% by weight of polyethylene glycol (having a molecular weight of about 400) and 0.5% by weight of para-toluenesulfonic acid (a known catalyst for condensation reactions). The solution was slowly heated to 200° F. and held at that temperature for one hour; at which time a sample was taken of the produced ester (hereafter referred to as Ester No. 1). The sample acid-anhydride eater may be represented by the following chemical structure:

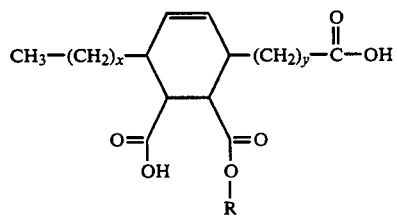

where R is a polyalcohol (or combination of polyalcohols) and $x + y = 12$.

The remaining solution was heated to a temperature of 400° F. and held at that temperature for one hour to produce another ester. This acid-anhydride ester may be represented by the following chemical structure:

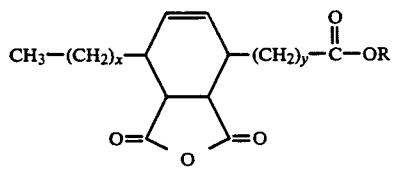

where R is a polyalcohol (or combination of polyalcohols) and $x + Y = 12$.

JET QUAT T-50 (manufactured by Jetco Chemical, Inc.), a standard quaternary corrosion inhibitor formulation commonly employed in the oil industry, was utilized for comparison purposes. The formulation for JET QUAT T-50 (hereafter referred to as JQ #1) consists of:
50.0%: Tallowtrimethyl Ammonium Chloride
32.0%: isopropanol and
18.0%: Water.

Testing procedures on the evaluated corrosion inhibitors were performed in a wheel oven which provides for a constant temperature and rotation rate of sample bottles. This emulates downwell conditions with both oil and water environments and high temperatures. Normal testing procedures call for sparging NACE brine solution and kerosene with $CO_2$ until saturated. The standard NACE brine formulation consists of 9.62% NaCl, 0.45% $CaCl_2$, 0.19% $MgCl_2$, and 89.74% $H_2O$. In order to imitate different conditions, the ratio of brine to kerosene may be varied, water may be substituted for the liquid, and $O_2$ substituted for the $CO_2$. (The actual conditions employed in each evaluation listed below are recited prior to the corresponding tabled results.) Metal coupons are cleaned in acetone, dried, weighed, and put into the testing bottles. The corrosion inhibitor formulation is subsequently added to the bottles. The bottles are sparged for several minutes with $CO_2$, and then equal amounts of kerosene and salt water are added. The bottles are capped, put into a wheel oven, and rotated through 360° to insure that each end of the metal coupon is exposed to both aqueous and oil environments. After this treatment has continued for one to two hours at 150° F., the coupons are removed and placed in a second set of bottles containing kerosene/salt water. These bottles are rotated for one hour; the coupons are removed a second time and again placed in a kerosene/salt water mixture and rotated at 150° F. for 22 hours to test for ultimate film persistency. After the treatment is complete, the metal coupons are removed from the bottles, rinsed in a 50/50:v/v:Methanol/Toluene and cleaned in a concentrated Hcl mixture containing additional acid corrosion inhibitor, rinsed first in distilled water and finally in isopropyl alcohol. The metal coupons are subsequently dried by manual wiping. The coupons are weighed, and the percent protection is reported according to the equation:

$$\% \text{ Protection} = \frac{A - B}{A} \times 100$$

$A$ = Weight loss of blank coupons
$B$ = Weight loss of inhibited coupons

This testing procedure, known as a film persistency test, evaluates how a corrosion inhibitor would perform in downhole conditions when the inhibitor is added in batches.

Another test, known as a continuous addition test, evaluates the performance of a corrosion inhibitor which is added continuously to a downhole situation. This test follows the procedure listed above except that the coupons are kept in the original bottled environment for the duration of the test, and the coupons are not removed from this environment until they are to be weighed.

The corrosion inhibitor formulations noted above were tested, the conditions of which are listed i Test 1 below. The results of the test are shown in Table I below.

| TEST 1 |  |
| --- | --- |
| Conditions: |  |
| Continuous Addition Test |  |
| Brine:Oil ratio | 100:0 |

-continued

TEST 1
Conditions:
Continuous Addition Test

| Brine | 10% NACE Brine |
|---|---|
| Exposure | 24 hours |
| Temperature | 150° F. |
| Gas | Saturated $CO_2$ |
| Coupons | 1018 Mild Steel |

TABLE I

| Acid-Anhydride Ester Corrosion Inhibitor | | | |
|---|---|---|---|
| | Corrosion Inhibitor* | | |
| Conc. | Ester #1 | Ester #2 | JQ #1 |
| 200 ppm | 61.0%** | 61.0% | 8.0% |

*Ester Nos. 1 and 2 were tested at 25% active. JQ #1 = JET QUAT T-50, which was tested at 50% active.
**Percent corrosion protection.

As shown above, the acid-anhydride esters produced from both the Diels-Alder adduct and the fatty acid-ene reaction product greatly outperformed the standard quaternary corrosion inhibitor formulation.

EXAMPLE 2

An oil-soluble, highly water-dispersible corrosion inhibitor was produced via the following method. An acid-anhydride material was produced via the method taught in Example 1. To a clean reactor was charged 88.6% by weight of this acid-anhydride material. To the material was added (with agitation) 10.9% by weight of diethylene glycol and 0.5% by weight of paratoluenesulfonic acid (a known catalyst for condensation reactions). The solution was slowly heated to a top temperature of about 380° F. As water began forming at approximately 320° F., it was important to apply enough $N_2$ sparge to remove the water from the reactor. The top temperature was held for about one hour (until the condensation reaction is driven to completion) to produce the acid-anhydride ester.

The acid-anhydride ester was subsequently reacted with an amine. To a clean reactor was charged 66.2% by weight of the ester and 37.8% by weight of imidazoline. The subsequent ionic reaction was conducted at 55° C. for one hour to produce the corrosion inhibitor. This corrosion inhibitor (hereafter referred to as CI-#1) was allowed to cool before being removed from the reactor. For testing purposes, the CI-#1 was incorporated into a corrosion inhibitor formulation (hereafter referred to as CIF-#1) consisting of:
25.0%: CI-#1
3.0%: Isopropanol
2.0%: WITCONATE ® 605A (an oil-soluble calcium dodecylbenzenesulfonate manufactured by Witch, Inc.)
2.0%: ETHOX TO-14 (a polyethylene glycol monotallate manufactured by Ethox Chemicals Inc.) and
68.0%: HANS (Heavy Aromatic Naphtha Solvent).
The CIF-#L was evaluated through a series of wheel oven tests, the results of which are listed in Tables II-V in Example 4 below.

EXAMPLE 3

An oil-soluble, highly water-dispersible corrosion inhibitor was produced via the following method. An amine-salted (i.e., neutralized) partial ester was produced using the method taught in Example 2. To a clean reactor was charged 92.8% by weight of this ester. To the ester was added (with agitation) 7.2% by weight of 100% active KOH. The mixture was heated to a temperature of about 60° C. and the ionic reaction was continued for a period of about 1.5 hours to produce the corrosion inhibitor. In subsequent tests, the amine and metal neutralized partial ester exhibited superior corrosion inhibiting characteristics.

EXAMPLE 4

An oil-soluble, highly water-dispersible corrosion inhibitor was produced via the following method. To a clean reaction apparatus (pressure reactor) was added 85.7% by weight of L-5, 14.2% by weight of maleic anhydride, and 0.1% of an iodine catalyst. (L-5 is a mixture of tall oil fatty acids containing about 40-50% linoleic acid and 40-50% oleic/elaidic acid, manufactured by Westvaco, Inc.) The mixture was heated and held for approximately two hours at 240° C. The resulting material was distilled under suitable conditions to remove any unreacted fatty acid which was still present.

In a second step, the residual unreacted oleic/elaidic acid is treated, under more vigorous conditions, with additional maleic anhydride to form the ene adduct. To a clean reaction apparatus (pressure reactor) was added 70.7% by weight of the residual unreacted oleic/eladic acid and 29.3% by weight of maleic anhydride. The mixture was heated and held for approximately four hours at 221° C. The resulting acid-anhydride material was distilled under suitable conditions to remove any unreacted fatty acid which was still present. This acid-anhydride material was back-blended in a 1:1 ratio by weight with the distilled acid-anhydride material from the first step to produce the acid-anhydride material subsequently used the following example.

To a clean reactor was charged 88.6% by weight of acid-anhydride material. To the material was added (with agitation) 10.9% by weight of diethylene glycol and 0.5% by weight of para-toluenesulfonic acid (a known catalyst for condensation reactions). The solution was slowly heated to a top temperature of about 380° F. As water began forming at approximately 320° F., it was important to apply enough $N_2$ sparge to remove the water from the reactor. The top temperature was held for about one hour (until the condensation reaction is driven to completion) to produce the acid-anhydride ester corrosion inhibitor.

To a clean reactor was charged 92.8% by weight of this ester. To the ester was added (with agitation) 7.2% by weight of 100% active KOH. The mixture was heated to a temperature of about 60° C. and the ionic reaction was continued for a period of about 1.5 hours. The potassium-salted ester was subsequently reacted with an amine. To a clean reactor was charged 76.7% by weight of the salted ester and 23.3% by weight of imidazoline. The mixture was heated to a temperature of about 60° C. and the ionic reaction was continued for a period of about 1.5 hours to produce the corrosion inhibitor. This corrosion inhibitor (hereafter referred to as CI-#2) was allowed to cool before being removed from the reactor. For testing purposes, the CI-#2 was incorporated into a corrosion inhibitor formulation (hereafter referred to as CIF-#2) consisting of:
25.0%: CI-#2
6.0%: Isopropanol
6.0%: ETHOX TO-14 (a polyethylene glycol monotallate manufactured by Ethox Chemicals, Inc.)

2.0%: CHEMLINK 1055 (an emulsion breaker intermediate) manufactured by Chemlink Petroleum, Inc.)
63.0%: Water Two standard quaternary corrosion inhibitor 1@formulations commonly used in the industry were produced for comparison purposes. The first formulation is JQ-#1, the specifics of which are listed in Example 1 above. The second standard quaternary corrosion inhibitor is JET QUAT S-50 (manufactured by Jetco Chemical, Inc.). This formulation (hereafter referred to as JQ-#2), consisted of:
50.0%: Soyatrimethyl Ammonium Chloride
32.0%: Isopropanol and
18.0%: Water.

Evaluative wheel tests were run on these standard quaternary corrosion inhibitor formulations and CIF numbers 1 and 2. The test conditions and results are listed below.

TEST 2
Conditions
Film Persistency Tests

| Brine:Oil ratio | 90:10 |
| Brine | 10% NACE Brine |
| Oil | Deodorized Kerosene |
| Film | 1 hour |
| Rinse | 1 hour |
| Exposure | 22 hours |
| Temperature | 150° F. |
| Gas | Saturated $CO_2$ |
| Coupons | 1018 Mild Steel |

TABLE II

| Formulations | % Protection | | | | | | |
|---|---|---|---|---|---|---|---|
| | 200* | 400* | 750* | 800* | 1500* | 2500* | 5000* |
| CIF 1 | 94.1 | 94.6 | — | 94.2 | — | — | — |
| CIF 2 | 84.4 | 89.1 | — | 91.6 | 96.0 | 96.9 | — |
| JQ 2 | — | — | 24.9 | — | 21.5 | 6.4 | 9.3 |

*In ppm.

The level of corrosion protection which the oil industry considers desirable in downhole applications is 90% or greater. For film persistency wheel testing, the generally accepted industry dosage for corrosion inhibitors (to yield the 90% protection) is 10,000 ppm, with a dosage of 5,000 ppm being considered a good inhibitor and 2,500 ppm considered an excellent one. Here, we see that acid-anhydride corrosion inhibitors exhibited outstanding results in the hydrocarbon environment—far exceeding the protection afforded by the standard quaternary inhibitor.

TEST 3
Conditions
Continuous Addition Tests

| Brine:Oil ratio | 90:10 |
| Brine | 10% NACE Brine |
| Oil | Deodorized Kerosene |
| Exposure | 24 hours |
| Temperature | 150° F. |
| Gas | Saturated $CO_2$ |
| Coupons | 1018 Mild Steel |

TABLE III

| Formulations | % Protection | |
|---|---|---|
| | 50 ppm | 100 ppm |
| CIF 1 | 87.4 | 90.0 |
| CIF 2 | 88.5 | 90.8 |

TABLE III-continued

| Formulations | % Protection | |
|---|---|---|
| | 50 ppm | 100 ppm |
| JQ 1 | 62.9 | 60.0 |
| JQ 2 | 67.2 | 47.6 |

As shown by the above continuous addition tests, the acid-anhydride ester corrosion inhibitors exhibited superior results in the hydrocarbon environment in comparison to the standard quaternary inhibitors.

TEST 4
Conditions
Continuous Addition Test

| Brine:Oil ratio | 100:0 |
| Brine | 10% NACE Brine |
| Exposure | 24 hours |
| Temperature | 150° F. |
| Gas | Saturated $CO_2$ |
| Coupons | 1018 Mild Steel |

TABLE IV

| Formulations | % Protection |
|---|---|
| | 100 ppm |
| CIF 1 | 75.2 |
| CIF 2 | 61.5 |
| JQ 1 | 53.1 |
| JQ 2 | 55.4 |

As shown by the above continuous addition test, the acid-anhydride ester corrosion inhibitors exhibited superior results in an aqueous brine environment in comparison to the standard quaternary inhibitors.

TEST 5
Conditions
Continuous Addition Tests

| Fluids | Tap Water |
| Gas | $O_2$ present |
| Exposure | 24 hours |
| Temperature | 150° F. |
| Coupons | 1018 Mild Steel |

TABLE V

| Formulations | % Protection | |
|---|---|---|
| | 100 ppm | 200 ppm |
| CIF 1 | 17.8 | 77.5 |
| JQ 1 | 3.5 | 8.4 |
| JQ 2 | 5.1 | 13.0 |

As shown by the above continuous addition tests, the acid-anhydride ester corrosion inhibitor exhibited outstanding results in the highly corrosive oxygen-rich aqueous brine environment.

Although in the above examples the various corrosion inhibitors were formulated for (and tested in) dynamic environments consistent with the strenuous conditions found in the practice of downhole drilling, it should be noted that the inhibitors will perform equally well in preventing corrosion when utilized in other, usually less strenuous, applications (i.e., oil and gas pipelines, finished goods pipelines, automobile radiators, etc.). Indeed, many modifications and variations of the present invention will be apparent to one of ordinary skill in the art in light of the above teaching. It is understood therefore that the scope of the invention is not to be limited by the foregoing description but rather is to be defined by the claims appended hereto.

What is claimed is:

1. A method for inhibiting corrosion in downwell oil field equipment and piping which is in contact with an oil/water medium taken from a producing well by coating said equipment and piping with a corrosion inhibitor having the general chemical structure of a member selected from the group consisting of:

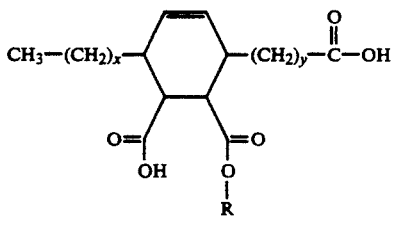

and

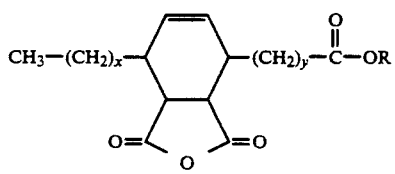

where R is a polyalcohol and x + y = 12.

2. The method of claim 1 wherein the corrosion inhibitor is a product of a process which comprises:
   (a) reacting $C_{18}$ unsaturated fatty acids and a member selected from the group consisting of: maleic anhydride, fumaric acid, and combinations thereof, to produce an acid-anhydride product selected from the group consisting of: fatty acid Diels-Alder adducts, fatty acid-ene reaction products, and combinations thereof; and
   (b) reacting in a condensation or hydrolyzation reaction said acid-anhydride product with a polyalcohol to produce a 25 to 75% esterified corrosion inhibitor.

3. The method of claim 1 wherein the corrosion inhibitor is a product of a process which comprises:
   (a) reacting $C_{18}$ unsaturated fatty acids and a member selected from the group consisting of: maleic anhydride, fumaric acid, and combinations thereof, to produce an acid-anhydride product selected from the group consisting of: fatty acid Diels-Alder adducts, fatty acid-ene reaction products, and combinations thereof; and
   (b) reacting in a condensation or hydrolyzation reaction said acid-anhydride product with a polyalcohol to produce a 40 to 60% esterified corrosion inhibitor.

4. The method of claim 1 wherein the polyalcohol is a member selected from the group consisting of: ethylene glycol, diethylene glycol, triethylene glycol, polyethylene glycol, glycerin, sorbitol, pentaerythritol, trimethylolpentane, and combinations thereof.

5. The method of claim 1 wherein a surfactant is employed in an admixture with said corrosion inhibitor.

6. The method of claim 5 wherein the surfactant is a member selected from the group consisting of:
   (a) fatty acid ethoxylates having a chemical structure of

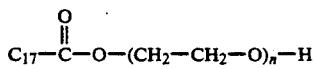

where n is an integer between 4 and 20;
   (b) nonylphenol ethoxylates having a chemical structure of

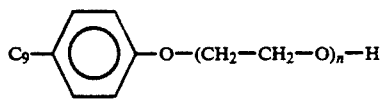

where n is an integer between 4 and 20;
   (c) alcohol ethoxylates having a chemical structure of

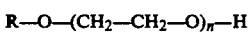

where R is $C_{12}$-$C_{18}$ and n is an integer between 4 and 20;
   (d) dodecylbenzenesulfonates having a chemical structure of

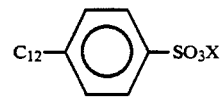

where X is a metal, amine, or ammonia; and
   (e) combinations thereof.

7. The method of claim 1 wherein a carrier solvent is added to disperse the corrosion inhibitor.

8. The method of claim 7 wherein the carrier solvent is a member selected from the group consisting of: water, alcohol, hydrocarbon-based solvents, and combinations thereof.

9. A method for inhibiting corrosion in downwell oil field equipment and piping which is in contact with an oil/water medium taken from a producing well by coating said equipment and piping with a neutralized corrosion inhibitor having the general chemical structure of a member selected from the group consisting of:

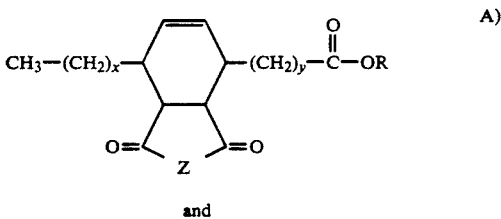

and

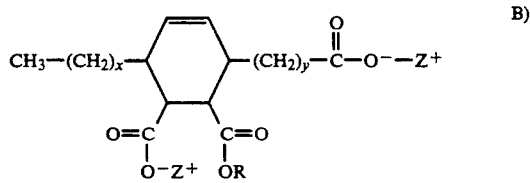

where R is a polyalcohol, x + y = 12, and Z and $Z^+$ are members selected from the group consisting of: imidazoline, fatty diamines, metal hydroxides, metal oxides, ammonia, and combinations thereof.

10. The method of claim 9 wherein the polyalcohol is a member selected from the group consisting of: ethylene glycol, diethylene glycol, triethylene glycol, polyethylene glycol, glycerin, sorbitol, pentaerythritol, trimethylolpentane, and combinations thereof.

11. The process of claim 9 wherein the metal contained in the metal hydroxides and metal oxides is a member selected from the group consisting of: lithium, potassium,, and sodium.

12. The method of claim 9 wherein the neutralized corrosion inhibitor is a product of a process which comprises:
   (a) reacting $C_{18}$ unsaturated fatty acids and a member selected from the group consisting of: maleic anhydride, fumaric acid, and combinations thereof to produce an acid-anhydride product selected from the group consisting of: fatty acid Diels-Alder adducts, fatty acid-ene reaction products, and combinations thereof;
   (b) reacting in a condensation or hydrolyzation reaction said acid-anhydride product with a polyalcohol to produce a 25 to 75% esterified corrosion inhibitor; and
   (c) reacting in an ionic reaction said esterified corrosion inhibitor with a member selected from the group consisting of: imidazoline, fatty diamines, and combinations thereof, thereby neutralizing from 50 to 774 by weight of the ester to form a neutralized corrosion inhibitor.

13. The method of claim 9 wherein the neutralized corrosion inhibitor is a product of a process which comprises:
   (a) reacting $C_{18}$ unsaturated fatty acids and a member selected from the group consisting of: maleic anhydride, fumaric acid, and combinations thereof to produce an acid-anhydride product selected from the group consisting of: fatty acid Diels-Alder adducts, fatty acid-ene reaction products, and combinations thereof;
   (b) reacting in a condensation or hydrolyzation reaction said acid-anhydride product with a polyalcohol to produce a 25 to 75% esterified corrosion inhibitor;
   (c) reacting in an ionic reaction said esterified corrosion inhibitor with a member of the group consisting of: imidazoline, fatty diamines, and combinations thereof, thereby neutralizing from 50 to 77% by weight of the ester to form a partially neutralized corrosion inhibitor; and
   (d) reacting in an ionic reaction the partially neutralized corrosion inhibitor with a member selected from a member of the group consisting of: metal hydroxides, metal oxides,, ammonia, and combinations thereof, thereby further neutralizing from 1 to 14% by weight of the ester to form a neutralized corrosion inhibitor.

14. The method of claim 9 wherein the neutralized corrosion inhibitor is a product of a process which comprises:
   (a) reacting $C_{18}$ unsaturated fatty acids and a member selected from the group consisting of: maleic anhydride, fumaric acid, and combinations thereof to produce an acid-anhydride product selected from the group consisting of: fatty acid Diels-Alder adducts, fatty acid-ene reaction products, and combinations thereof;
   (b) reacting in a condensation or hydrolyzation reaction said acid-anhydride product with a polyalcohol to produce a 25 to 75% esterified corrosion inhibitor; and
   (c) reacting in an ionic reaction said esterified corrosion inhibitor with a member selected from the group consisting of: metal hydroxides, metal oxides, ammonia, and combinations thereof, thereby neutralizing from 1 to 14% by weight of the ester to form a neutralized corrosion inhibitor.

15. The method of claim 9 wherein the neutralized corrosion inhibitor is a product of a process which comprises:
   (a) reacting $C_{18}$ unsaturated fatty acids and a member selected from the group consisting of: maleic anhydride, fumaric acid, and combinations thereof to produce an acid-anhydride product selected from the group consisting of: fatty acid Diels-Alder adducts, fatty acid-ene reaction products, and combinations thereof;
   (b) reacting in a condensation or hydrolyzation reaction said acid-anhydride product with a polyalcohol to produce a 25 to 75% esterified corrosion inhibitor;
   (c) reacting in an ionic reaction said esterified corrosion inhibitor with a member selected from the group consisting of: metal hydroxides, metal oxides, ammonia, and combinations thereof, thereby neutralizing from 1 to 14% by weight of the ester to form a partially neutralized corrosion inhibitor; and
   (d) reacting in an ionic reaction the partially neutralized corrosion inhibitor with a member selected from the group consisting of: imidazoline, fatty diamines, and combinations thereof, thereby further neutralizing from 50 to 77% by weight of the ester to form a neutralized corrosion inhibitor.

16. The method of claim 9 wherein a surfactant is employed in an admixture with the neutralized corrosion inhibitor.

17. The method of claim 16 wherein the surfactant is a member selected from the group consisting of:
   (a) fatty acid ethoxylates having a chemical structure of

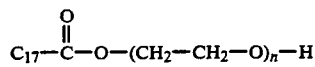

where n is an integer between 4 and 20;
   (b) nonylphenol ethoxylates having a chemical structure of

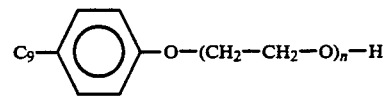

where n is an integer between 4 and 20;
   (c) alcohol ethoxylates having a chemical structure of

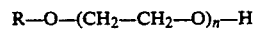

where R is $C_{12}$-$C_{18}$ and n is an integer between 4 and 20;
   (d) dodecylbenzenesulfonates having a chemical structure of

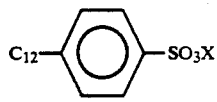
where X is a metal, amine, or ammonia; and
(e) combinations thereof.
18. The method of claim 9 wherein a carrier solvent is added to disperse the neutralized corrosion inhibitor.
19. The method of claim 18 wherein the carrier solvent is a member selected from the group consisting of: water, alcohol, hydrocarbon-based solvents, and combinations thereof.
* * * * *

UNITED STATES PATENT AND TRADEMARK OFFICE
CERTIFICATE OF CORRECTION

PATENT NO. : 5,292,480
DATED : March 8, 1994
INVENTOR(S) : Eugene R. Fischer et al.

It is certified that error appears in the above-indentified patent and that said Letters Patent is hereby corrected as shown below:

In column 2, line 29, delete "Inhibitor" and substitute therefor --inhibitor--.

In column 2, line 62, delete "Subsequently" and substitute therefor --subsequently--.

In column 3, line 5, after ($H_2S$) delete "I" and insert --,--.

In column 3, line 24, delete "804" and substitute therefor --80%--.

In column 4, line 19, between y and 12, insert -- = --.

In column 5, line 3, delete "Combinations" and substitute therefor --combinations--.

In column 5, line 4, after Additionally, delete second ",".

UNITED STATES PATENT AND TRADEMARK OFFICE
CERTIFICATE OF CORRECTION

PATENT NO. : 5,292,480  
DATED : March 8, 1994  
INVENTOR(S) : Eugene R. Fischer et al.

Page 2 of 3

It is certified that error appears in the above-indentified patent and that said Letters Patent is hereby corrected as shown below:

In column 7, line 5, after was, delete "I".

In column 7, line 31, delete "eater" and substitute therefor --ester--.

In column 7, line 60, delete "Y" and substitute therefor --y--.

In column 7, line 68, delete "isopropanol" and substitute therefor --Isopropanol--.

In column 8, line 61, delete "i" and substitute therefor --in--.

In column 9, line 54, delete "Witch" and substitute therefor --Witco--.

In column 9, line 59, delete "#L" and substitute therefor --#1--.

In column 11, line 4, after inhibitor, delete "1θ".

UNITED STATES PATENT AND TRADEMARK OFFICE
CERTIFICATE OF CORRECTION

PATENT NO. : 5,292,480
DATED : March 8, 1994
INVENTOR(S) : Eugene R. Fischer et al.

It is certified that error appears in the above-indentified patent and that said Letters Patent is hereby corrected as shown below:

In claim 11, column 15, line 7, after potassium, delete second ",".

In claim 12, column 15, line 26, delete "774" and substitute therefor --77%--.

In claim 13, column 15, line 53, after oxides, delete second ",".

In claim 17, column 16, line 60, delete "10".

Signed and Sealed this

Twelfth Day of July, 1994

Attest:

BRUCE LEHMAN

Attesting Officer     Commissioner of Patents and Trademarks